US012722586B2

(12) United States Patent
Page

(10) Patent No.: US 12,722,586 B2
(45) Date of Patent: Sep. 1, 2026

(54) BUMPER FOR PUSHING DUMP TRUCKS

(71) Applicant: Todd Page, St Francis, WI (US)

(72) Inventor: Todd Page, St Francis, WI (US)

( * ) Notice: Subject to any disclaimer, the term of this patent is extended or adjusted under 35 U.S.C. 154(b) by 429 days.

(21) Appl. No.: 18/221,269

(22) Filed: Jul. 12, 2023

(65) Prior Publication Data

US 2025/0018891 A1 Jan. 16, 2025

(51) Int. Cl.

| | |
|---|---|
| ***B60R 19/24*** | (2006.01) |
| ***B60Q 1/26*** | (2006.01) |
| ***B60R 19/02*** | (2006.01) |
| ***B60R 19/44*** | (2006.01) |
| ***B60R 19/50*** | (2006.01) |
| ***B60R 19/52*** | (2006.01) |

(52) U.S. Cl.

CPC ............ *B60R 19/24* (2013.01); *B60Q 1/2661* (2013.01); *B60R 19/023* (2013.01); *B60R 19/50* (2013.01); *B60R 19/44* (2013.01); *B60R 19/52* (2013.01)

(58) Field of Classification Search

USPC ....... 293/102, 104, 115, 117, 132, 142, 143, 293/144

See application file for complete search history.

(56) References Cited

U.S. PATENT DOCUMENTS

| | | | | |
|---|---|---|---|---|
| 3,302,958 A | | 2/1967 | Etal | |
| 3,606,388 A | | 9/1971 | Campbell | |
| 4,068,877 A | | 1/1978 | Burleson | |
| 4,273,369 A | * | 6/1981 | Rosenbaum | B60R 19/023 293/118 |
| 5,102,198 A | * | 4/1992 | Hagenbuch | B60D 3/00 293/118 |
| D343,817 S | | 2/1994 | Morrow | |
| 5,366,264 A | | 11/1994 | Guay | |
| 7,073,830 B1 | * | 7/2006 | Chen | B60R 19/44 293/109 |
| 8,939,478 B2 | | 1/2015 | Fisher | |
| 10,780,854 B1 | | 9/2020 | Hixson | |
| 10,843,514 B2 | * | 11/2020 | Mascola | B60D 1/485 |
| 2002/0024224 A1 | * | 2/2002 | Bio | B60R 19/44 293/142 |
| 2003/0034660 A1 | * | 2/2003 | Kelly | B60R 19/44 293/142 |
| 2008/0116703 A1 | * | 5/2008 | Malina | B60R 19/44 293/142 |
| 2008/0129060 A1 | * | 6/2008 | Schutt | B60R 19/02 293/136 |
| 2008/0290673 A1 | * | 11/2008 | Arnt | B60R 19/56 293/143 |

(Continued)

FOREIGN PATENT DOCUMENTS

CA 2790363 11/2013

*Primary Examiner* — Gregory A Blankenship

(57) ABSTRACT

A vehicle pushing apparatus for facilitating transferring a pushing force between two vehicles includes a bumper body comprising a main portion and a protruding portion coupled to a top side of the main portion. The bumper body is mountable to a selected one of a front end and a rear end of a primary vehicle such that the protruding portion is positioned between a pair of indicator lights of the primary vehicle. The bumper body may be positioned against a secondary vehicle so that either the primary vehicle may push the secondary vehicle or the secondary vehicle may push the primary vehicle via the bumper body.

7 Claims, 7 Drawing Sheets

(56) References Cited

U.S. PATENT DOCUMENTS

| | | | | |
|---|---|---|---|---|
| 2009/0091145 | A1* | 4/2009 | Malina | B60R 19/44 293/142 |
| 2011/0198874 | A1* | 8/2011 | Lee | B60R 19/44 293/142 |
| 2017/0210320 | A1* | 7/2017 | Prevor | B60R 19/023 |
| 2017/0253205 | A1* | 9/2017 | Dagrossa | B60R 19/44 |
| 2019/0291669 | A1* | 9/2019 | Pavlik | B60R 19/56 |
| 2020/0139912 | A1* | 5/2020 | Gaskin | B60R 19/023 |
| 2020/0172035 | A1* | 6/2020 | Rahman | B60R 19/48 |
| 2020/0238936 | A1* | 7/2020 | Schumacher | B60R 19/50 |
| 2022/0016964 | A1* | 1/2022 | Hart | B60R 19/44 |
| 2024/0367722 | A1* | 11/2024 | Eisenbarth | B60G 11/27 |
| 2024/0383394 | A1* | 11/2024 | Ayestarán Díaz | B60P 1/28 |
| 2025/0018891 | A1* | 1/2025 | Page | B60Q 1/2661 |
| 2025/0100334 | A1* | 3/2025 | Foley | B60D 1/56 |

* cited by examiner 10
54
36
42
52
48
44
46
56
62
50
60
58

BUMPER FOR PUSHING DUMP TRUCKS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bumper attachment and more particularly pertains to a new bumper attachment for facilitating transferring a pushing force between two vehicles.

(2) Description of Related Art Including Information Disclosed Under 37 CFR 1.97 and 1.98

The prior art discloses myriad bumper attachments which mount to a front or rear of a primary vehicle to provide a surface to push against a secondary vehicle without damaging the primary vehicle. The devices of the prior art include features such as a concave shape to secure the device around an exterior of the secondary vehicle and rolling elements to prevent abrasive damage to the secondary vehicle. However, the prior art does not disclose such a device which comprises a main portion and a protruding portion coupled to the top of the main portion so that the device may extend a vertical distance without obscuring indicator lights of the primary vehicle. The prior art also does not describe such an apparatus which has an engagement surface positioned farther forward or backward from a set of wheels of the primary vehicle such that the secondary vehicle may engage the apparatus without interfering with the wheels of the primary vehicle.

BRIEF SUMMARY OF THE INVENTION

An embodiment of the disclosure meets the needs presented above by generally comprising a push bumper apparatus including a bumper body. The bumper body has a main portion and a protruding portion coupled to a top side of the main portion. The protruding portion is spaced from each one of a pair of lateral sides of the main portion. The bumper body is configured to be selectively mounted to one of a front end and a rear end of a primary vehicle. The bumper body is configured for being urged against a secondary vehicle to alternately facilitate the primary vehicle pushing the secondary vehicle and the secondary vehicle pushing the primary vehicle via the bumper body. The protruding portion of the bumper body has a width such that the protruding portion is positionable between an associated pair of indicator lights of a plurality of indicator lights of the primary vehicle when the bumper body is mounted to the primary vehicle.

Another embodiment of the disclosure includes a primary vehicle with a frame, a plurality of wheels rotatably coupled to the frame, and a pair of indicator lights coupled to a rear end of the frame. A bumper body is mounted to the rear end of the frame and is configured for being urged against a secondary vehicle to facilitate the secondary vehicle pushing the primary vehicle via the bumper body. The bumper body comprises a main portion and a protruding portion coupled to a top side of the main portion. The protruding portion is spaced from each one of a pair of lateral sides of the main portion and is positioned between the pair of indicator lights.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
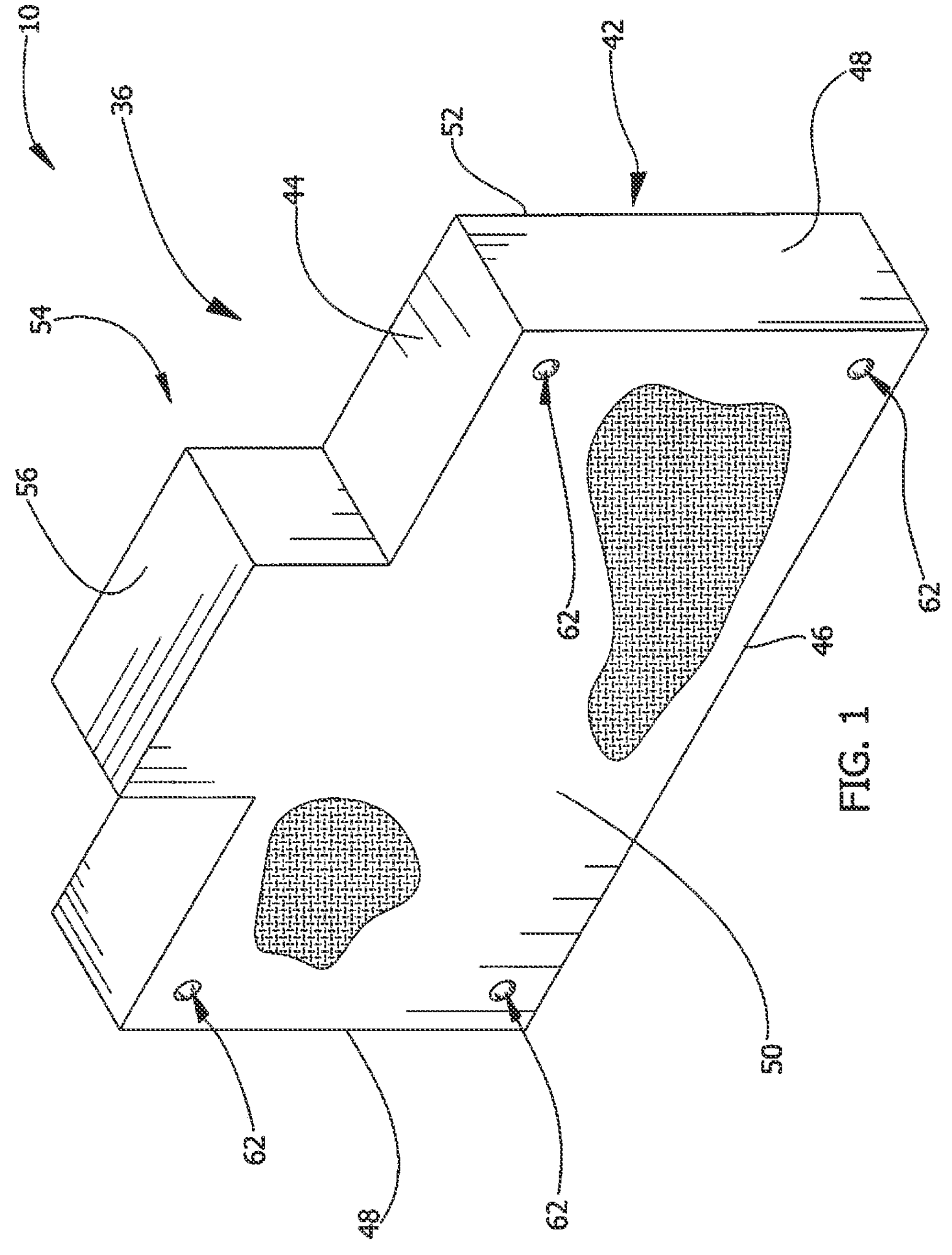
FIG. 1 is a top front side perspective view of a bumper body of a vehicle pushing apparatus according to an embodiment of the disclosure.
Figure 2:
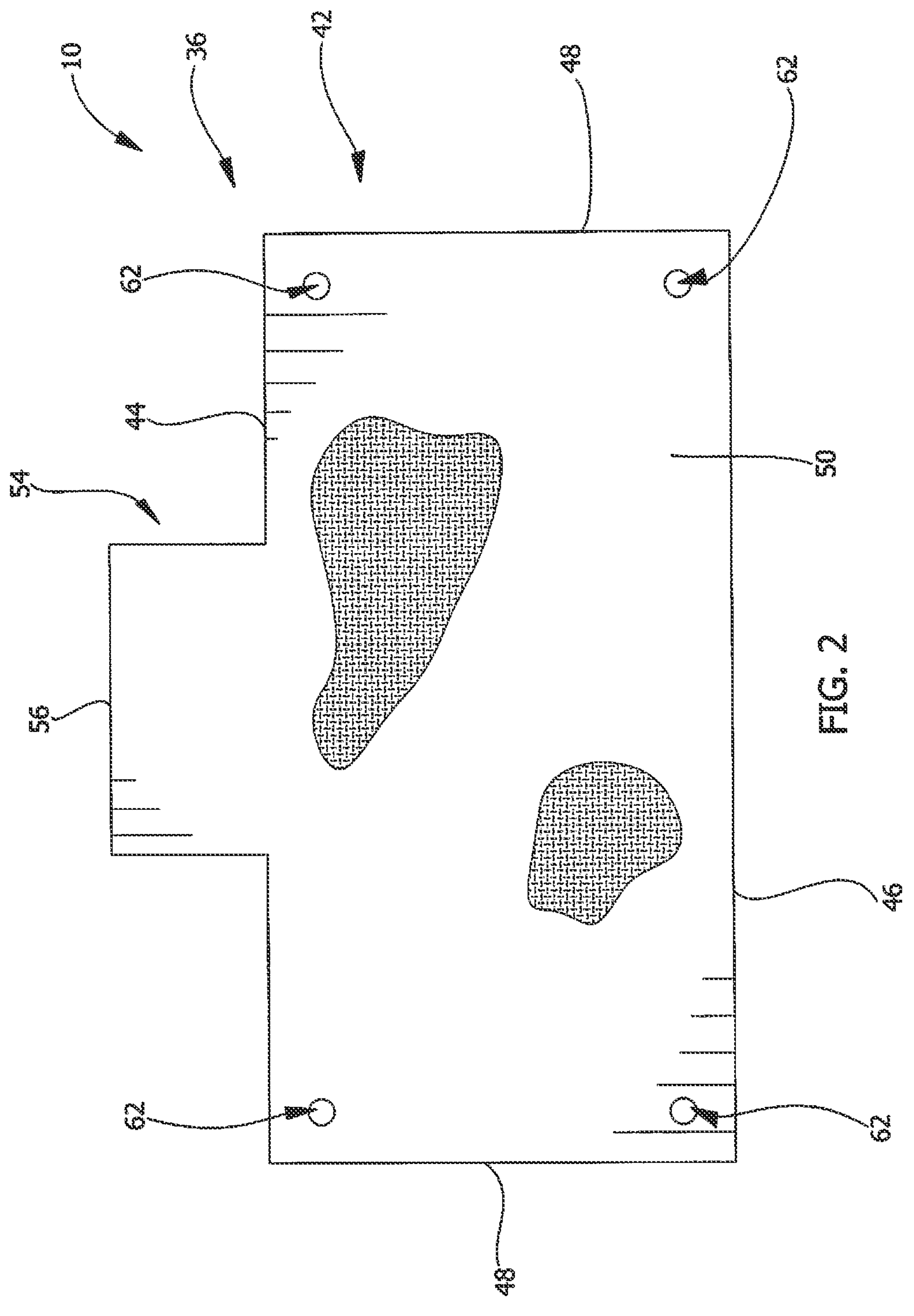
FIG. 2 is a front view of the bumper body of an embodiment of the disclosure.
Figure 3:
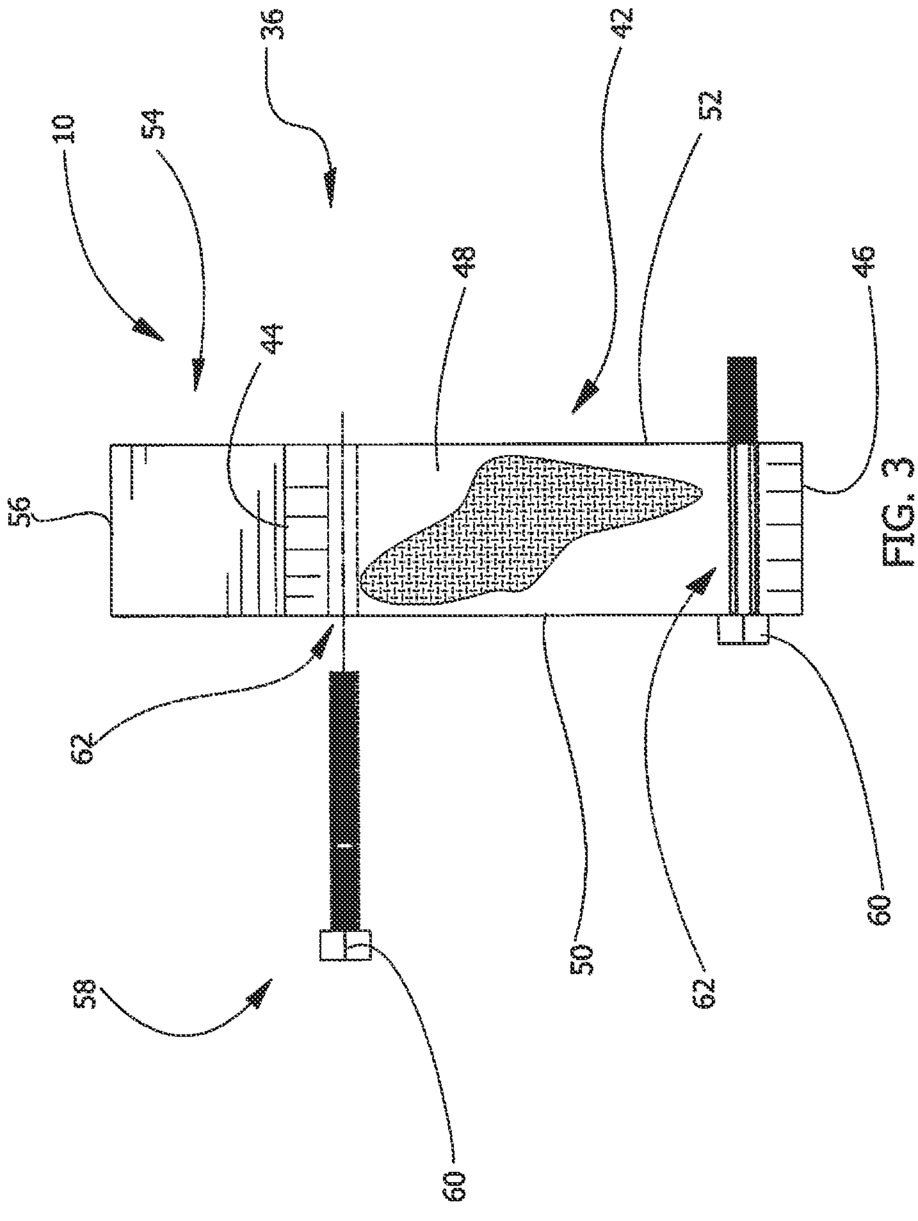
FIG. 3 is a side exploded view of the bumper body of an embodiment of the disclosure.
Figure 4:
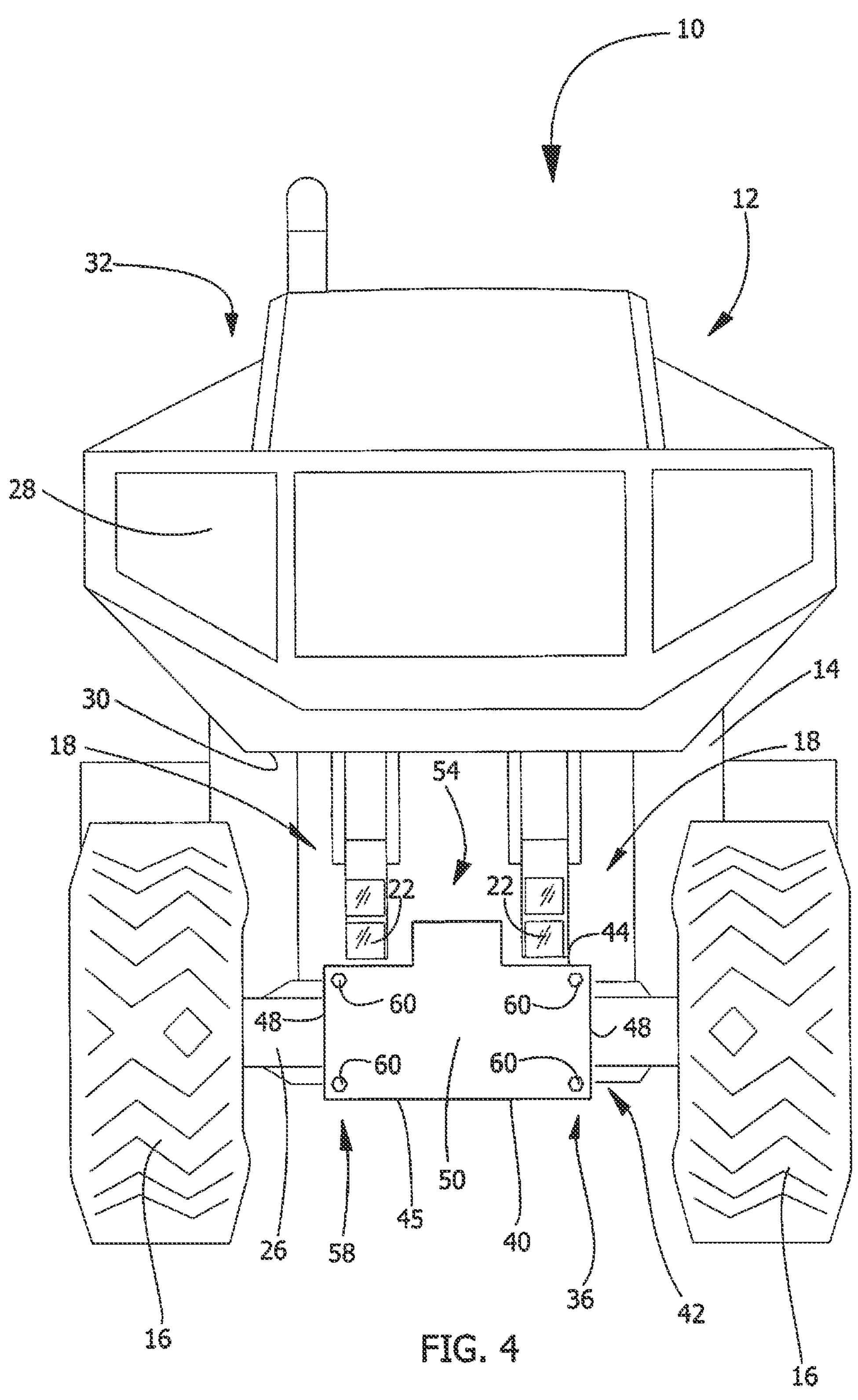
FIG. 4 is a rear in-use view of an embodiment of the disclosure.
Figure 5:
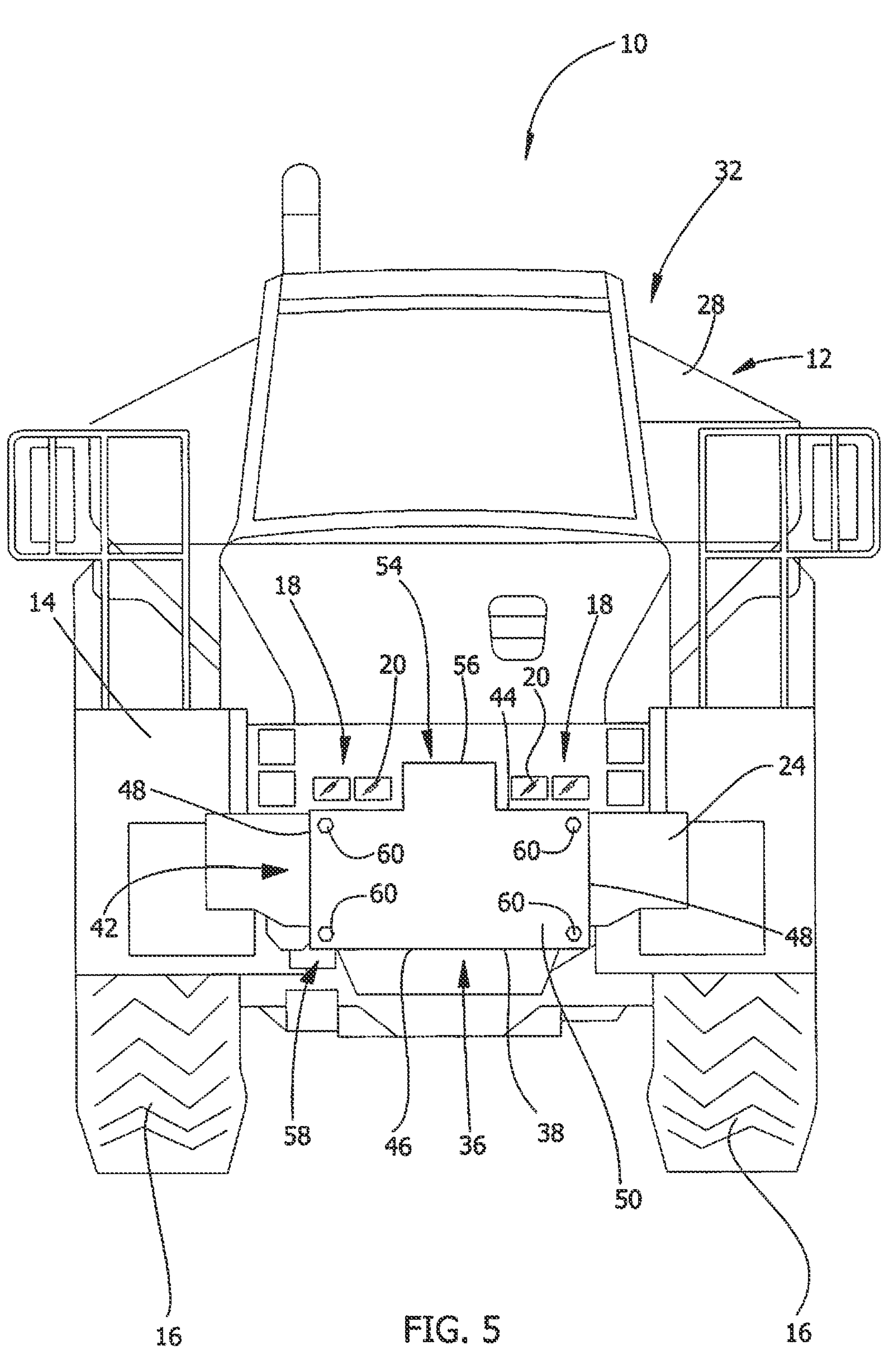
FIG. 5 is a front in-use view of an embodiment of the disclosure.
Figure 6:
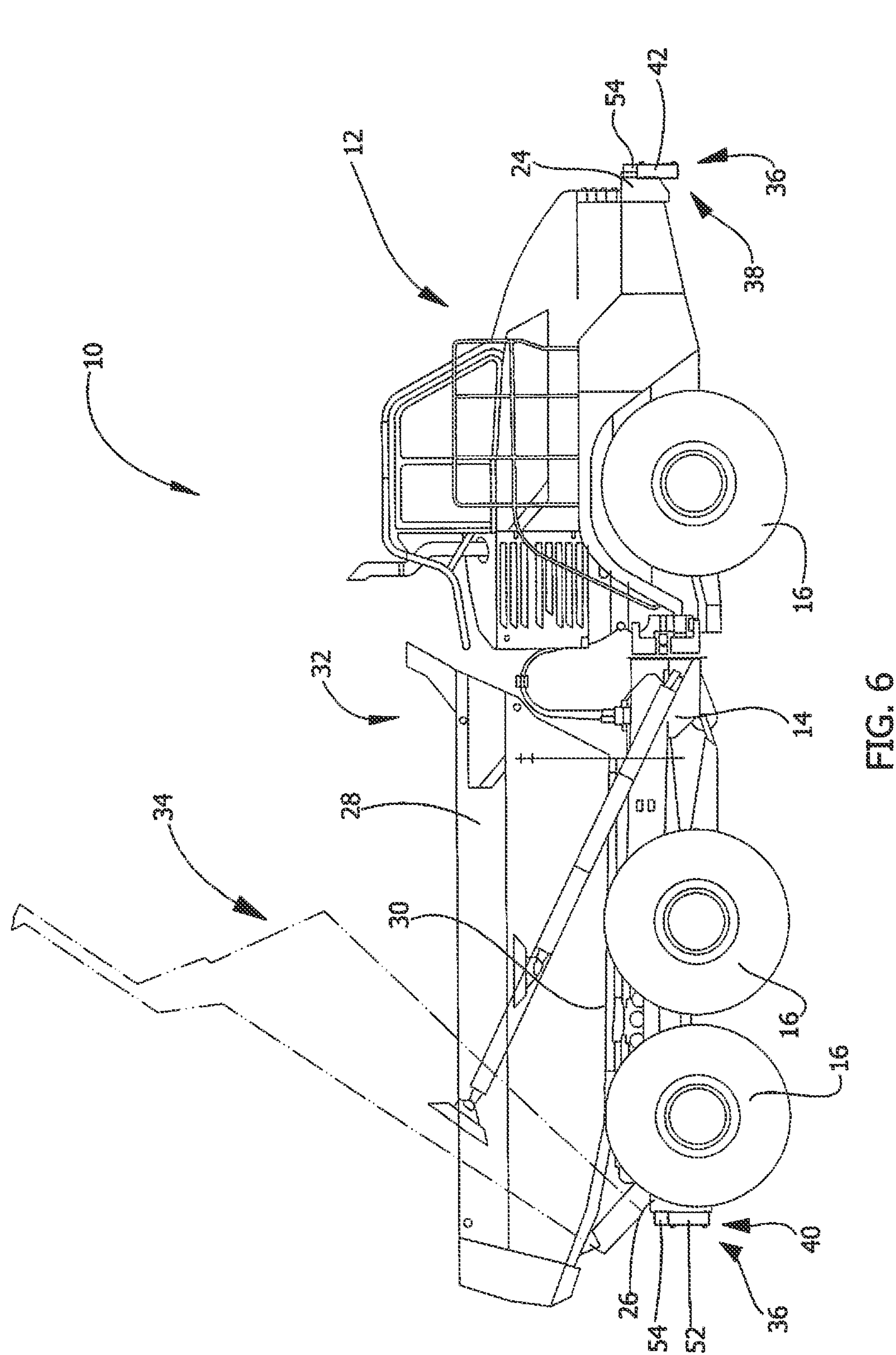
FIG. 6 is a side in-use view of an embodiment of the disclosure.
Figure 7:
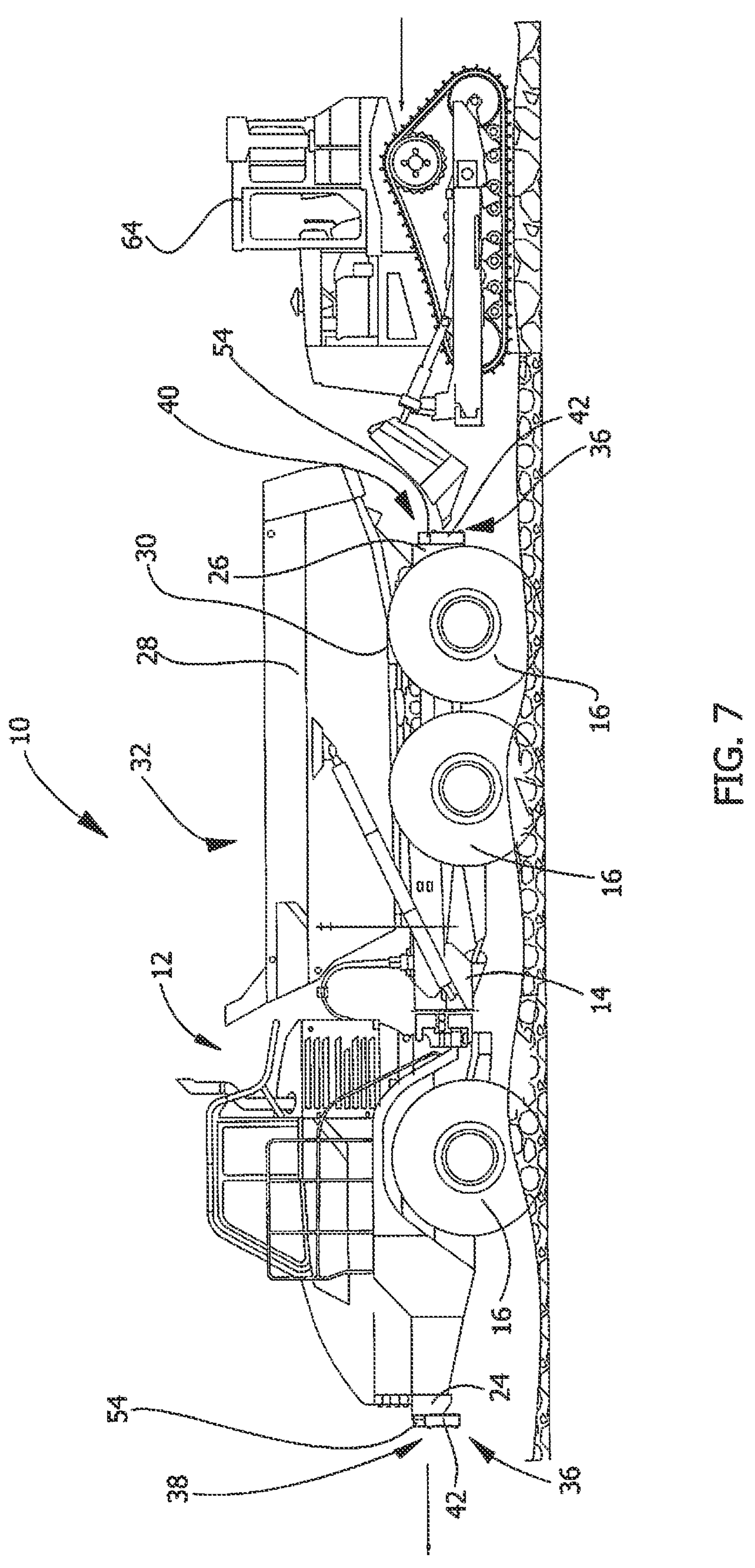
FIG. 7 is a side in-use view of an embodiment of the disclosure.

With reference now to the drawings, and in particular to FIGS. 1 through 7 thereof, a new bumper attachment embodying the principles and concepts of an embodiment of the disclosure and generally designated by the reference numeral 10 will be described.

As best illustrated in FIGS. 1 through 7, the vehicle pushing apparatus 10 generally comprises a primary vehicle 12 with a frame 14 and a plurality of wheels 16 rotatably coupled to the frame 14. The primary vehicle 12 also comprises a plurality of indicator lights 18 coupled to the frame 14, including a pair of front indicator lights 20 positioned on a front end 24 of the frame 14 and a pair of rear indicator lights 22 positioned on a rear end 26 of the frame 14. The primary vehicle 12 has a vessel 28 mounted on the frame 14 which is movable with respect to the frame 14 between a resting position 32 wherein a base 30 of the vessel 28 lies adjacent to the frame 14 and a dumping position 34 wherein the base 30 extends forwardly and upwardly from the frame 14. The primary vehicle 12 may be, for example, a dump truck, wherein the vessel 28 is a dump body of the dump truck.

A pair of bumper bodies 36 is mounted to the frame 14, including a front bumper body 38 mounted to the front end 24 of the frame 14 and a rear bumper body 40 coupled to the rear end 26 of the frame 14. Each bumper body 36 of the pair of bumper bodies 36 is configured for being urged against a secondary vehicle 64 to alternately facilitate the primary vehicle 12 pushing the secondary vehicle 64 and the secondary vehicle 64 pushing the primary vehicle 12 via the bumper body 36. For example, the secondary vehicle 64 may be a bulldozer which pushes the primary vehicle 12 forwardly via the rear bumper body 40 using the blade of the bulldozer. The secondary vehicle 64 may alternatively be another dump truck, which the primary vehicle 12 pushes forwardly via the front bumper body 38.

Each bumper body 36 of the pair of bumper bodies 36 comprises a main portion 42 and a protruding portion 54. The protruding portion 54 is coupled to a top side 44 of the main portion 42 and is spaced from each one of a pair of lateral sides 48 of the main portion 42. The protruding portion 54 of the rear bumper body 40 is positioned between the pair of rear indicator lights 22, and the protruding portion 54 of the front bumper body 38 is positioned between the pair of front indicator lights 20. The front side 50 of each bumper body 36 of the pair of bumper bodies 36 faces away from the frame 14. The front side 50 of the rear bumper body 40 is spaced rearwardly with respect to the frame 14 from the plurality of wheels 16, and the front side 50 of the front bumper body 38 is spaced forwardly with respect to the frame 14 from the plurality of wheels 16. The rear bumper body 40 is positioned such that the rear bumper body 40 does not interfere with the vessel 28 when the vessel 28 moves from the resting position 32 to the dumping position 34. The main portion 42 of each bumper body 36 has a thickness between the front side 50 and the rear side 52 of between 1.5 inches and 4.5 inches and a width between the pair of lateral sides 48 of between 15.0 inches and 21.0 inches. Each bumper body 36 of the pair of bumper bodies 36 has a height between a top surface 56 of the protruding portion 54 and a bottom side 46 of the main portion 42 of between 9.0 inches and 15.0 inches. The protruding portion 54 of each bumper body 36 is centered between the pair of lateral sides 48 of the main portion 42.

The main portion 42 of each bumper body 36 has a plurality of holes 62 extending therethrough from a front side 50 of the main portion 42 to a rear side 52 of the main portion 42. Each one of a pair of mounts 58 is coupled to each of the frame 14 and an associated bumper body 36 of the pair of bumper bodies 36 to mount the associated bumper body 36 to the frame 14. Each mount 58 of the pair of mounts 58 comprises a plurality of bolts 60 which is insertable through the plurality of holes 62 of the associated bumper body 36.

In use, a selected one of the bumper bodies 36 is placed against the secondary vehicle 64 so that the secondary vehicle 64 may urge the primary vehicle 12 to move via the selected bumper body 36 without damaging the primary vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle pushing apparatus comprising:

a primary vehicle comprising:

a frame;

a plurality of wheels being rotatably coupled to the frame; and a pair of indicator lights being coupled to a rear end of the frame;

a bumper body being mounted to the rear end of the frame, the bumper body being configured for being urged against a secondary vehicle to facilitate the secondary vehicle pushing the primary vehicle via the bumper body, the bumper body comprising a main portion and a protruding portion, the protruding portion being coupled to a top side of the main portion, the protruding portion being spaced from each one of a pair of lateral sides of the main portion, the protruding portion being positioned between the pair of indicator lights;

the main portion of the bumper body has a plurality of holes extending therethrough from a front side of the main portion to a rear side of the main portion; and a mount is coupled to each of the frame and the bumper body to mount the bumper body to the frame, the mount comprising a plurality of bolts which is insertable through the plurality of holes of the associated bumper body.

2. The apparatus of claim 1, wherein the front side of the bumper body faces away from the frame, the front side of the bumper body being spaced rearwardly with respect to the frame from the plurality of wheels.

3. The apparatus of claim 1, wherein the main portion of the bumper body has a thickness between the front side and the rear side of between 1.5 inches and 4.5 inches.

4. The apparatus of claim 1, wherein the main portion of the bumper body has a width between the pair of lateral sides of between 15.0 inches and 21.0 inches.

5. The apparatus of claim 1, wherein the bumper body has a height between a top surface of the protruding portion and a bottom side of the main portion of between 9.0 inches and 15.0 inches.

6. A vehicle pushing apparatus comprising:

a primary vehicle comprising:

a frame;

a plurality of wheels being rotatably coupled to the frame; and a pair of indicator lights being coupled to a rear end of the frame;

a bumper body being mounted to the rear end of the frame, the bumper body being configured for being urged against a secondary vehicle to facilitate the secondary vehicle pushing the primary vehicle via the bumper body, the bumper body comprising a main portion and a protruding portion, the protruding portion being coupled to a top side of the main portion, the protruding portion being spaced from each one of a pair of lateral sides of the main portion, the protruding portion being positioned between the pair of indicator lights;

wherein the primary vehicle further comprises a vessel being mounted on the frame, the vessel being movable with respect to the frame between a resting position wherein a base of the vessel lies adjacent to the frame and a dumping position wherein the base extends forwardly and upwardly from the frame; and wherein the bumper body is positioned such that the rear bumper body does not interfere with the vessel when the vessel moves from the resting position to the dumping position.

7. A vehicle pushing apparatus comprising:

a primary vehicle comprising:

a frame;

a plurality of wheels being rotatably coupled to the frame;

a plurality of indicator lights being coupled to the frame, the plurality of indicator lights including a pair of front indicator lights positioned on a front end of the frame and a pair of rear indicator lights positioned on a rear end of the frame; and a vessel being mounted on the frame, the vessel being movable with respect to the frame between a resting position wherein a base of the vessel lies adjacent to the frame and a dumping position wherein the base extends forwardly and upwardly from the frame;

a pair of bumper bodies being mounted to the frame, the pair of bumper bodies including a front bumper body mounted to the front end of the frame and a rear bumper body mounted to the rear end of the frame, each bumper body of the pair of bumper bodies being configured for being urged against a secondary vehicle to alternately facilitate the primary vehicle pushing the secondary vehicle and the secondary vehicle pushing the primary vehicle via the bumper body, each bumper body of the pair of bumper bodies comprising a main portion and a protruding portion, the protruding portion being coupled to a top side of the main portion, the protruding portion being spaced from each one of a pair of lateral sides of the main portion, the protruding portion of the rear bumper body being positioned between the pair of rear indicator lights, the protruding portion of the front bumper body being positioned between the pair of front indicator lights, the front side of each bumper body of the pair of bumper bodies facing away from the frame, the front side of the rear bumper body being spaced rearwardly with respect to the frame from the plurality of wheels, the front side of the front bumper body being spaced forwardly with respect to the frame from the plurality of wheels, the rear bumper body being positioned such that the rear bumper body does not interfere with the vessel when the vessel moves from the resting position to the dumping position, the main portion of each bumper body having a plurality of holes extending therethrough from a front side of the main portion to a rear side of the main portion, the main portion of each bumper body having a thickness between the front side and the rear side of between 1.5 inches and 4.5 inches, the main portion of each bumper body having a width between the pair of lateral sides of between 15.0 inches and 21.0 inches, each bumper body of the pair of bumper bodies having a height between a top surface of the protruding portion and a bottom side of the main portion of between 9.0 inches and 15.0 inches, the protruding portion of each bumper body being centered between the pair of lateral sides of the main portion; and a pair of mounts, each mount of the pair of mounts being coupled to each of the frame and an associated bumper body of the pair of bumper bodies to mount the associated bumper body to the frame, each mount of the pair of mounts comprising a plurality of bolts which is insertable through the plurality of holes of the associated bumper body.

* * * * *